United States Patent
Burch

[15] 3,678,771
[45] July 25, 1972

[54] TWO-SPEED DRIVE SYSTEM
[72] Inventor: John L. Burch, Decatur, Ala.
[73] Assignee: The United States of America as represented by the Administrator of the National Aeronautics and Space Administration
[22] Filed: Dec. 31, 1970
[21] Appl. No.: 103,091

[52] U.S. Cl. ..................................................74/217 R
[51] Int. Cl. ..................................................F16h 9/00
[58] Field of Search ......................................74/217 R

[56] References Cited
FOREIGN PATENTS OR APPLICATIONS
855,158  11/1952  Germany...........................74/217 R Primary Examiner—C. J. Husar
Attorney—L. D. Wofford, Jr., W. H. Riggins and John R. Manning

[57] ABSTRACT

A two-speed drive system for driving an independently driven vehicle wheel comprising a relatively large wheel sprocket attached to the vehicle wheel. A drive belt passes around the large wheel sprocket and one of a pair of smaller, selectively interchangeable, motor-driven wheels. The two smaller wheels are of the same diameter but rotate at different speeds and are mounted on a plate that may be temporarily released through a latching pawl for rotation of 180° so that the two wheels change places. No external force is required to rotate the plate, when released, since one of the smaller wheels turning in contact with the drive belt causes the plate to rotate rather then the drive belt and large wheel sprocket. When the drive belt is engaging both of the smaller wheels simultaneously during the shifting phase, the normally slower turning wheel is permitted to turn faster through a ratchet mechanism.

8 Claims, 5 Drawing Figures

Patented July 25, 1972

JOHN L. BURCH
INVENTOR

BY *Wayland L. Riggin*
ATTORNEY

JOHN L. BURCH
*INVENTOR*

BY Wayland H. Riggins

*ATTORNEY*

Patented July 25, 1972

JOHN L. BURCH
INVENTOR

BY Wayland H. Riggins
ATTORNEY 3,678,771

TWO-SPEED DRIVE SYSTEM

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates generally to drive systems and more particularly to a two-speed drive system for a wheel of a vehicle wherein the shifting from one drive speed to the other drive speed is effected by means inherent in the drive system.

Multispeed drive systems known in the prior art vary considerably in design and thus in reliability, complexity, cost and maintenance requirements. Some of the systems utilize a plurality of shifting gears that run in a bath of heavy oil or grease and are associated with clutches and shifting mechanisms that result in a rather costly, complex and heavy apparatus that requires considerable maintenance. Certain of the simplified systems, while being less costly and complex, involve the inconvenience of manually transferring a drive belt or chain from one sprocket to another sprocket of different diameter.

In certain drive system applications it is particularly desirable that the drive system be very simple, lightweight and reliable and yet provide a low maintenance system having a convenient means for shifting speeds. Such a drive system appears to be applicable, for example, in wheeled vehicles for transporting astronauts as they explore the lunar surface. It is anticipated that the wheels of these lunar vehicles will be individually driven using battery-powered electric motors. A suitable two-speed drive system for each wheel of the vehicle would enhance the mobility and usefulness of the vehicle.

SUMMARY OF THE INVENTION

The invention comprises a pair of power transmitting wheels mounted diametrically opposite each other on a selectively rotatable plate member. The first of the pair of wheels is driven by a motor drive shaft and the second wheel is driven by the first wheel through a larger intermediate step-down wheel so that the second wheel turns at a slower rpm than the first. A main drive belt passes around one of the plate-mounted wheels and a relatively large wheel sprocket that may be attached to and thus drive a wheel of a vehicle. The plate member on which the pair of wheels are mounted is selectively releasable for rotation and when the plate member rotates 180° the two wheels exchange positions and thus change the wheel that is engaged by the main drive belt. The pull force exerted by the main drive belt against the turning plate-mounted wheel is used to rotate the plate. When the belt engages both of the plate-mounted wheels simultaneously during the shifting phase, the normally slower turning wheel is permitted to turn faster through a ratchet mechanism.

Accordingly, it is a general object of the present invention to provide a two-speed drive system that is simple, reliable and low in maintenance requirements.

A more specific object of the invention is to provide a simplified two-speed drive system for driving a wheel of a vehicle wherein the shift in speed is made by utilizing forces inherent in the drive system thus avoiding the need for an external shifting force.

Another object of the invention is to provide a reliable and lightweight two-speed drive system for driving individually driven wheels of a lunar surface vehicle which drive system requires a minimum amount of maintenance, is convenient to shift, and is capable of being driven by an electric motor.

These and other objects and advantages of the invention will become apparent upon reference to the following specification, attendant claims and drawing.

DESCRIPTION OF THE PREFERRED EMBODIMENT

Figure 1:
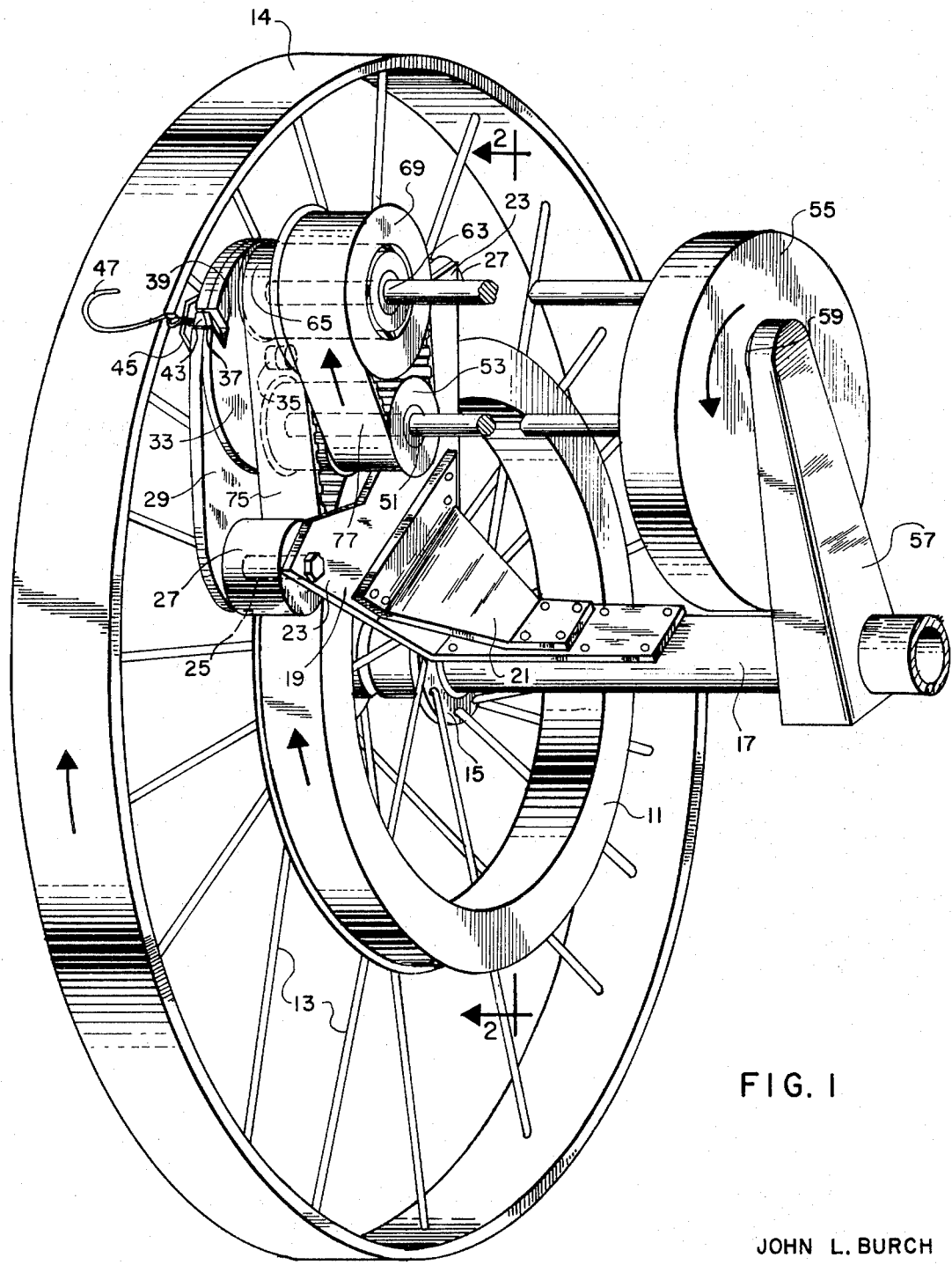
FIG. 1 is a pictorial view showing a two-speed drive system arranged in the low-speed position and installed on the inside of a spoked wheel for driving the wheel.

Referring to FIG. 1, therein is shown a wheel drive sprocket 11 attached to spokes 13 of a driven wheel 14 which may be one wheel of a vehicle wherein the wheels of the vehicle are individually driven through the two-speed drive system of the present invention. The spokes 13 radiate from a wheel hub 15 that turns on an axle 17 and the spokes are attached to the sprocket 11 by conventional clamps (not visible in the drawing).

Welded to the axle 17 is a triangular bracket plate 19 reinforced by a corner brace 21. The bracket 19 has a pair of extensions 23, each having an end of a fixed shaft 25 joined thereto and on which an idler 27 turns. Each of the shafts 25 is fixed at the other end to a relatively large stationary plate member 29. A rotatable circular plate member 33 is pivotally joined at its center to the stationary plate member 29 by a pivot pin 35. A portion of the upper edge of the stationary plate member 29 is circular so that it corresponds to and is flush with the circular plate member 33. Aligned notches 37 and 39 are provided in the plates 29 and 33, respectively, and a spring-urged latching pawl 43 reciprocates within the notches 37 and 39 to selectively release the plate member 33 for rotation around the pivot pin 35. Two of the notches 39 are formed in the plate member 33 180° apart. The latching pawl 43 is mounted on the plate member 29 by a bracket 45 and is actuated through a cable 47 extending to the desired operating location.

A drive shaft 51 has one end thereof rotatably mounted in the plate member 33, and fixed to the drive shaft 51 is a power transmitting wheel 53. The drive shaft 51 extends perpendicular to the plate 33 to an electric motor 55 that selectively rotates the shaft 51. The motor 55 is pivotally joined to a bracket 57 through a fitting 59 so that the motor may rotate eccentrically counterclockwise around an axis that coincides with a line defining the rotational axis of the plate 33 as will be explained hereinafter.

A second shaft 63 is rotatably mounted at one end in the plate 33 and at the other end to the motor 55, extending parallel with the drive shaft 51. The shaft 63 is merely rotatably mounted to the housing of the motor 55 and is not directly driven by the motor 55. Power transmitting wheel 65 equal in diameter and length to the wheel 53 is fixed to the shaft 63. The wheel 65 over a portion thereof is joined to a step-down wheel 69 of larger diameter than the wheels 53 and 65. The pair of wheels 53 and 65 and the shafts 51 and 63 are diametrically aligned with each other and with the pivot pin 35, with the pivot pin 35 being located midway between the shafts 51 and 63. The pair of wheels 53 and 65 are also in a common plane that extends perpendicular to the shafts 51 and 63.

Figure 5:
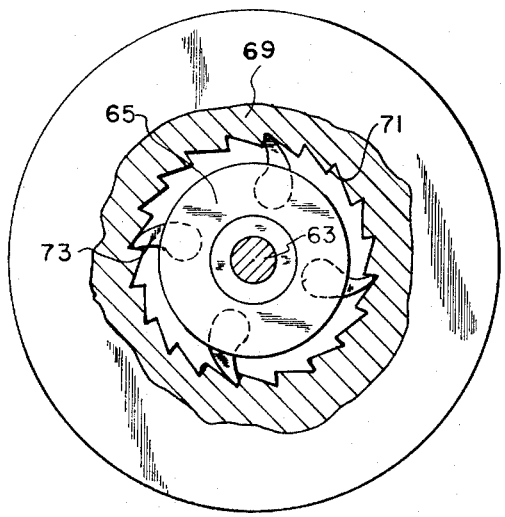
FIG. 5 is an enlarged view, partially in section, showing a ratchet mechanism operative during the speed shifting phase for permitting the low-speed power transmitting wheel to turn at a faster than normal speed.

A ratchet drive is incorporated between the wheel 65 and the step-down wheel 69. As shown in FIG. 5, the ratchet mechanism comprises a series of teeth 71 formed around the inner surface of the step-down wheel 69 and a plurality of pawls 73 projecting from the wheel 65 and engaging the teeth 71. As is apparent, the wheel 65 may turn clockwise within the step-down sprocket 69, the reason for which will become apparent in the forthcoming description of the operation of the invention.

As shown in FIG. 1, a drive belt 75 passes around the wheel drive sprocket 11 and the wheel 65. The outside surface of the belt 75 passes over the idlers 27. A belt 77 passes around the step-down wheel 69 and a portion of the wheel 53. The remaining portion of the wheel 53 is not in contact with either belt in the position shown in FIG. 1.

It is evident that the electric motor 55 may be positioned very close to the wheels 53 and 61, making the shafts 51 and 63 very short. In FIG. 1 the motor 55 is shown spaced from the wheels 53 and 61 primarily for purposes of clarity in the illustration.

OPERATION

Figure 2:
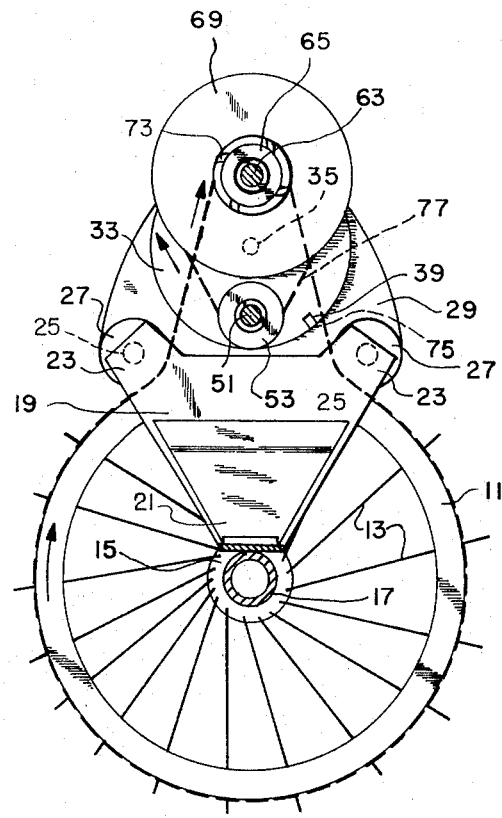
FIG. 2 is a schematic elevational view of the two-speed drive system of FIG. 1 taken generally along line 2—2 of FIG. 1 and showing the drive system in the low-speed position.

As shown in FIGS. 1 and 2, the drive system is in the low speed position and the belts 75 and 77 would be moving in the clockwise direction as indicated by the arrows. The drive shaft 51 of the motor 55 turns the wheel 53 clockwise which drives the step-down wheel 69 through the belt 77. The step-down wheel 69, being larger in diameter than the wheel 53, turns at a lower rpm than the wheel 53. The wheel 65 turns at the same rpm as the step-down wheel 69 since it is connected to the wheel 69 through the ratchet mechanism shown in FIG. 5. Thus in the position of FIGS. 1 and 2 the wheel 65 drives the wheel sprocket 11 through the drive belt 75 at a relatively low speed.

Figure 4:
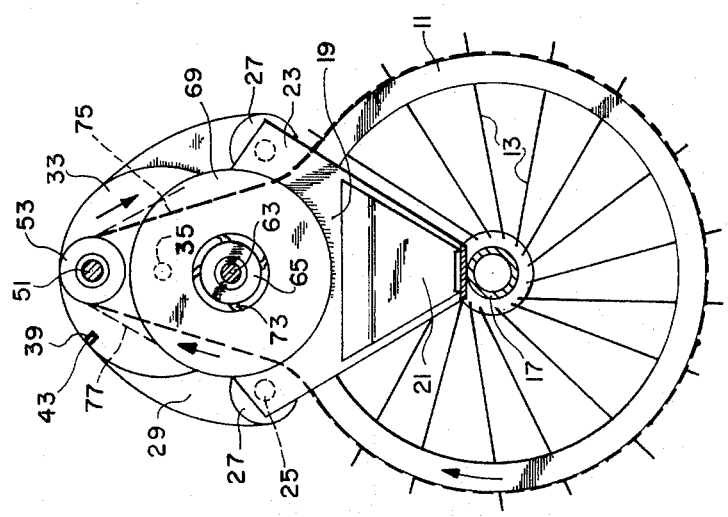
FIG. 4 is a view similar to FIG. 2 but showing the drive system in the high-speed position.

When it is desired to shift the drive system to the relatively high-speed position illustrated in FIG. 4, the spring-urged latching pawl 43 is retracted by the cable 47 to unlock the rotatable plate 33 from the plate 29. Since the plate 33 is then free to rotate, the wheel 65, turning in contact with the drive belt 75, will cause the plate 33 to rotate counterclockwise rather than forcing the drive belt 75 to rotate clockwise. Thus the wheel 65 rolls along the inner surface of the drive belt. As the plate 33 rotates counterclockwise the drive belt 75 will contact simultaneously both of the wheels 53 and 65, as indicated in FIG. 3, which shows the drive system in the transitory position between the low-speed and high-speed positions.

When the drive belt 75 is in contact simultaneously with the wheels 53 and 65 it is necessary for both of these wheels to turn at the same speed. The ratchet mechanism between the wheel 65 and the step-down wheel 69 shown in FIG. 5 permits the wheel 65 to turn clockwise within the step-down wheel 69 as the pawls 73 ride over the teeth 71. Therefore, the wheel 65 may turn at the same speed as the wheel 53 during the time when both wheels are in contact with the drive belt 75 as shown in FIG. 3.

Figure 3:
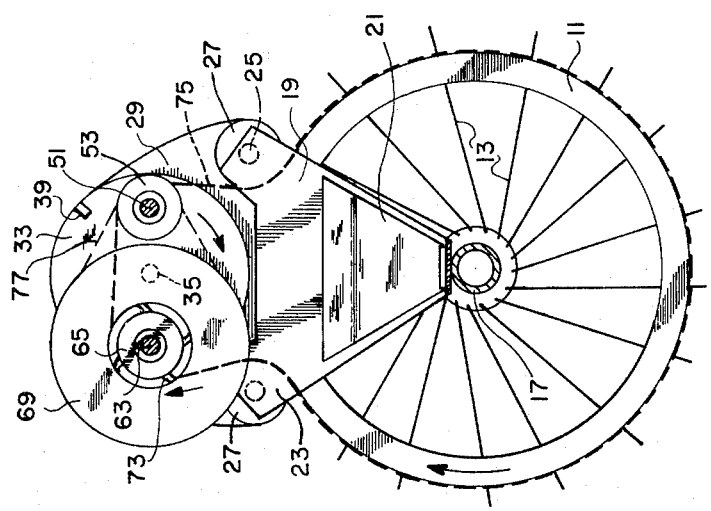
FIG. 3 is a view similar to FIG. 2 but showing the drive system during the shifting phase from one speed to the other.

When the drive assembly is in the transitory position of FIG. 3 the plate 33 has rotated substantially 90° counterclockwise and will continue to rotate counterclockwise until it has rotated 180° at which time it will be automatically locked to the plate 29 by the spring-urged pawl 43 sliding into the notch 39. As previously indicated, the notches 39 are located 180° apart on the rotatable plate 33. After the full 180° rotation of the plate 33 the drive system will be locked in the high-speed position shown in FIG. 4. In this position the drive belt 75 passes over the wheel 53 that turns at a high speed relative to the wheel 65 over which the drive belt passed in the low-speed position of FIGS. 1 and 2. The wheel 65 is not in contact with the drive belt 75 in the high-speed position of FIG. 4 although it is still turning at a relatively low speed.

To change the drive system back to the low-speed position of FIGS. 1 and 2 it is only necessary to retract the latching pawl 43 and the plate 33 will rotate another 180° causing the pair of wheels 53 and 65 to exchange positions again. As the wheels 53 and 65 exchange places to shift from one speed to another the motor 55, supported by bracket 57, rotates eccentrically counterclockwise around an axial line passing through the pivot pin 35 just as do the wheels 53 and 65.

In the high-speed position of FIG. 4 the drive system may be driven in the reverse direction by reversing the motor 55. However, in the low-speed position of FIGS. 1 and 2 the drive system cannot be driven in reverse because the step-down wheel 69 would thus be turning counterclockwise and the ratchet teeth 71 (FIG. 5) would slide over the pawls 73 without transferring the required torque to the wheel 65.

I claim:

1. A two-speed drive system comprising:
   a. a rotatable member pivotally joined to a supporting member for rotation around a predetermined axis;
   b. means for locking said rotatable member against rotation around said predetermined axis;
   c. a pair of power transmitting wheels mounted on said rotatable member, said wheels being arranged for rotation around axes parallel with said predetermined axis;
   d. portions of said pair of wheels being in the same plane, said plane being perpendicular to said parallel axes;
   e. means for driving said pair of wheels, said means including means for driving one of said wheels at a lower rpm than the other of said wheels;
   f. a third rotatable wheel disposed coplanar with said portions of said pair of wheels and adapted to be driven selectively by either of said pair of wheels;
   g. a drive belt engaging said third wheel and one of said pair of wheels;
   h. the other of said pair of wheels being disengaged from said drive belt;
   i. means for selectively releasing said rotatable member for rotation around said predetermined axis whereby said rotatable member will rotate as said wheel engaging said drive belt turns in contact with said belt.

2. The invention as defined in claim 1 wherein said pair of wheels are of substantially equal diameter, said third wheel being larger in diameter than said pair of wheels, the said wheel being disengaged from said drive belt being disposed between said third wheel and said one of said pair of wheels engaging said drive belt.

3. The invention as defined in claim 2 wherein said predetermined axis of said rotatable member is located midway between and in diametrical alignment with the axes of rotation of said pair of wheels whereby said pair of wheels exchange position upon 180° rotation of said rotatable member, said locking means including means for automatically locking said rotatable member after rotation of 180°.

4. The invention as defined in claim 2 wherein said means for driving one of said pair of wheels at a lower rpm than the other of said pair of wheels comprises a step-down wheel joined coaxially with one of said pair of wheels, a drive belt engaging said step-down wheel and the other of said pair of said wheels, said step-down wheel being of larger diameter than either of said pair of wheels.

5. The invention as defined in claim 4 wherein said step-down wheel is joined to said one of said pair of wheels by means including means for permitting said one wheel to rotate at a different rpm than said step-down wheel.

6. The invention as defined in claim 2 wherein said means for driving said pair of wheels includes an electric motor, means for interconnecting said electric motor with one of said pair of wheels whereby power is transmitted from said motor to said one of said pair of wheels.

7. The invention as defined in claim 6 including means for supporting said electric motor for rotation around an axis in alignment with said predetermined axis.

8. The invention as defined in claim 2 wherein said rotatable member comprises a circular plate, said predetermined axis being located at the center of said plate, said means for locking said plate against rotation comprising two diametrically opposed notches in said plate.

* * * * *